United States Patent [19]

Yoshida et al.

[11] Patent Number: 4,833,231

[45] Date of Patent: May 23, 1989

[54] POLYMER HAVING ISOINDOLE STRUCTURE

[75] Inventors: Haruo Yoshida; Nobuo Uotani; Yoshihiro Saida, all of Oita, Japan

[73] Assignee: Showa Denko Kabushiki Kaisha, Tokyo, Japan

[21] Appl. No.: 92,916

[22] PCT Filed: Dec. 6, 1986

[86] PCT No.: PCT/JP86/00619

§ 371 Date: Aug. 6, 1987

§ 102(e) Date: Aug. 6, 1987

[87] PCT Pub. No.: WO87/03607

PCT Pub. Date: Jun. 18, 1987

[30] Foreign Application Priority Data

Dec. 6, 1985 [JP] Japan .................................. 60-273501

[51] Int. Cl.⁴ .............................................. C08G 61/12
[52] U.S. Cl. .................................... 528/423; 522/167; 526/259
[58] Field of Search ......................... 528/423; 526/259

[56] References Cited

U.S. PATENT DOCUMENTS 4,487,667  12/1984  Traynor .............................. 528/423

OTHER PUBLICATIONS

J. Bornstein et al., *J. Org. Chem.*, 22, 1255–1256 (1957).
J. Thesing et al., *Lieb. Ann. Chem.*, 671, 119–121 (1964).
R. Kreher et al., *Tetrahedron Letters*, No. 23, 2591–2592 (1966).
W. Ried et al., *Chem. Ber.*, 91, 2485–2486 (1958).
*Dictionary of the Organic Compounds*, 3398 (1982).
J. Bornstein et al., *J.C.S. Chem. Comm.*, 1149–1150 (1972).
R. Kreher et al., *Angew, Chem. Int. Ed. Engl.*, 23 (1984), No. 7, 517–518.
G. Priestley et al., *Tetrahedron Letters*, No. 42, 4295≧4298 (1972).

*Primary Examiner*—Harold D. Anderson
*Attorney, Agent, or Firm*—Sughrue, Mion, Zinn, Macpeak and Seas

[57] ABSTRACT

A polymer having an isoindole structure represented by the following general formula:

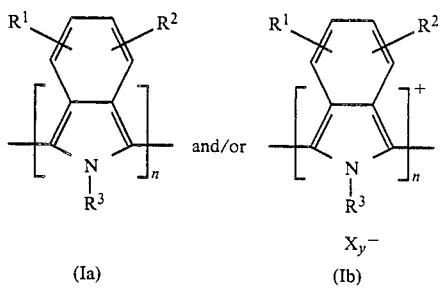

(Ia) and/or (Ib)

wherein $R^1$, $R^2$ and $R^3$ independently represent a hydrogen atom or a hydrocarbon group having 1 to 5 carbon atoms $X^-$ represents an anion of an electrolyte, y is a number of from 0.01 to 1, which indicates the proportion of the anion to 1 mole of the monomer, and n is a number of from 5 to 500, which indicates the degree of polymerization, shows a high electroconductivity when doped, and the stability of the polymer in the oxidized state is high. This polymer is obtained by subjecting an isoindole compound represented by the following general formula:

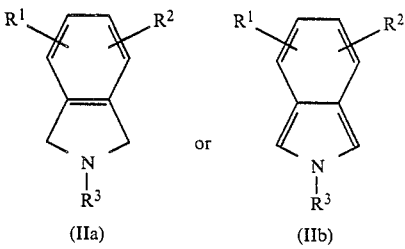

(IIa) or (IIb)

wherein $R^1$, $R^2$ and $R^3$ are as defined above, to (1) electrochemical polymerization in the presence of an electrolyte in a solvent or (2) oxidative polymerization in a solvent by the action of an oxidant.

4 Claims, 6 Drawing Sheets

(nm)
Wave Number

POLYMER HAVING ISOINDOLE STRUCTURE

TECHNICAL FIELD

The present invention relates to a novel electroconductive polymer having an isoindole structure, which is very stable and shows a very high electroconductivity when doped, and a process for the preparation thereof.

This polymer can be used for the production of an electrode, an electrochromic display element, a solar cell, an electric connection, a device for the absorption and conversion of electromagnetic waves, and a reversible oxidation-reduction system in the fields of electric and electronic industries.

BACKGROUND ART

Recently, rapid progress has been made in reducing the weight, decreasing the thickness, and reducing the size of electric and electronic instruments, and there is a strong demand for a reduction of the weight, a decrease in thickness, and a reduction in size of various electromagnetic material elements used for these instruments. In this connection, a development of novel materials having further improved properties is also strongly demanded.

New electroconductive materials have been widely developed to satisfy these demands. For example, since polyacetylene is given an electroconductivity as high as $10^2$ to $10^3$ s/cm by doping with iodine or arsenic pentafluoride [see Synthetic Metals, Volume 1, No. 2, page 101 (1979/1980)] and has excellent charge-discharge characteristics, polyacetylene has been investigated as an electrode material of a secondary battery. Moreover, since polyacetylene has absorption characteristics such that beams to be absorbed are close to solar beams, polyacetylene is under examination as a material of a solar cell.

However, polyacetylene is easily oxidized and doped polyacetylene is very sensitive to moisture. Moreover, arsenic pentafluoride or the like used for manifesting a high electroconductivity is highly toxic and is dangerous to the human body.

Polythiophene is under examination as an electroconductive material or battery electrode material because it has a conjugated structure similar to that of cis-type polyacetylene, and a peculiar electron structure containing sulfur atoms. Moreover, polythiophene is under investigation as an electrochromic material in which the color is changed by doping. For example, A. M. Druy el al reports that if 2,2'-bithienyl is electrochemically polymerized, a color change of blue-red is caused in the formed polymer in the oxidized state-reduced state and this change is reversible, and the polymer is valuable as an electrochromic material [J. de Physique, 44, 6, C3-595 (1983)].

However, polythiophene has a problem in that since polythiophene is unstable in the doped state and is easily dedoped, it is difficult to maintain a high electroconductivity.

In view of the foregoing defects of the conventional techniques, it is a primary object of the present invention to provide a novel polymer which is very stable in air and can be easily doped with an ordinary dopant so that it is possible to maintain a high electroconductivity.

DISCLOSURE OF THE INVENTION

The polymer according to the present invention is a polymer having an isoindole structure represented by the following general formula:

(Ia)    (Ib)

wherein $R^1$, $R^2$ and $R^3$ independently represent a hydrogen atom or a hydrocarbon group having 1 to 5 carbon atoms, $X^-$ represents an anion of an electrolyte, y is a number of from 0.01 to 1, which indicates the proportion of the anion to 1 mole of the monomer, and n is a number of from 5 to 500, which indicates the degree of polymerization.

The polymer of the present invention can be easily prepared according to various polymerization processes.

According to a typical process, an isoindoline compound represented by the following general formula (IIa):

wherein $R^1$, $R^2$ and $R^3$ are as defined above, or an isoindole compound represented by the following general formula (IIb):

wherein $R^1$, $R^2$ and $R^3$ are as defined above, is subjected to (1) electrochemical polymerization in the presence of an electrolyte in a solvent or (2) oxidative polymerization in a solvent by the action of an oxidant.

BEST MODE FOR CARRYING OUT THE INVENTION

The polymer having an isoindole structure in the neutral state (i.e., the dedoped state) is represented by the general formula (Ia), and the polymer having an isoindole structure in the doped state is represented by the general formula (Ib). These polymers are reversible.

As the polymer having the isoindole structure represented by the general formula (Ia), there can be mentioned polyisoindole, poly(2-methylisoindole), poly(2-ethylisoindole), poly(2-phenylisoindole), poly(5-methylisoindole), poly(5-ethylisoindole), and poly(5,6-dimethylisoindole). As the anion $X^-$ of the polymer having the isoindole structure represented by the general formula (Ib), there can be mentioned $Cl^-$, $Br^-$, $I^-$, $ClO_4^-$, $BF_4^-$, $PF_6^-$, $AsF_6^-$, $SbF_6^-$, $AlCl_4^-$, $AlBr_3Cl^-$, $FeCl_4^-$, $SnCl_3^-$ and $CF_3SO_3^-$.

The polymer having an isoindole structure according to the present invention is characterized in that (i) a very high electroconductivity is manifested by doping, (ii) oxidation-reduction can be electrochemically performed repeatedly and an inherent color is shown in each state, and (iii) the polymer is stable in the oxidized state.

The polymer of the present invention can be obtained by polymerizing an isoinsoline compound represented by the general formula (IIa) or an isoindole compound represented by the general formula (IIb).

As the isoindoline compound represented by the general formula (IIa), there can be mentioned, for example, isoindoline, 2-methylisoindoline, 2-ethylisoindoline, 2-phenylisoindoline, 5-methylisoindoline, 5-ethylisoindoline, and 5,6-dimethylisoindoline.

As the isoindole compound represented by the general formula (IIb), there can be mentioned, for example, isoindole, 2-methylisoindole, 2-ethylisoindole, 2-phenylisoindole, 5-methylisoindole, 5-ethylisoindole, and 5,6-dimethylisoindole.

An appropriate solvent is selected according to the kind of the polymerization process as the solvent to be used for polymerization of the above-mentioned isoindoline compound or isoindole compound, and the kind of the solvent is not particularly critical. Generally speaking, where the isoindoline compound represented by the general formula (IIa) or the isoindole compound represented by the general formula (IIb) is electrochemically polymerized in the presence of an electrolyte, there can be used, for example, acetonitrile, benzonitrile, propionitrile, dioxane, tetrahydrofuran, sulfolane, propylene carbonate, and tertiary butyl alcohol.

Where the isoindoline compound represented by the general formula (IIa) or the isoindole compound represented by the general formula (IIb) is oxidatively polymerized, there can be used, for example, dichloromethane, chloroform, carbon tetrachloride, dichloroethane, tetrachloroethane, nitromethane, nitroethane, nitrobenzene, chlorobenzene, N-methyl-2-pyrrolidone, and carbon disulfide.

As the electrolyte used in the electrochemical polymerization process, there can be mentioned tetraethylammonium bromide, tetraethylammonium chloride, tetra-n-butylammonium bromide, tetra-n-butylammonium chloride, tetraphenylphosphonium bromide, and tetraphenylphosphonium chloride.

As the oxidant used in the oxidative polymerization process, there can be used quinones such as 2,3-dichloro-5,6-dicyano-1,4-benzoquinone, tetrachloro-1,2-benzoquinone, and tetrachloro-1,4-benzoquinone, and halogens such as iodine and bromine.

The polymerization temperature adopted for polymerization of the above-mentioned isoindoline compound or isoindole compound is determined according to the polymerization process and is not particularly critical. In general, however, preferably the polymerization is carried out at a temperature in the range of from $-80°$ C. to $+200°$ C. The polymerization time is changed according to the polymerization process, the polymerization temperature and the structure of the isoindoline compound or isoindole compound and is not simply defined, but generally preferably, the polymerization is conducted for 0.25 to 200 hours.

The isoindoline compound represented by the general formula (IIa) can be synthesized by known processes. For example, isoindoline in which all of $R^1$, $R^2$, and $R^3$ in the general formula (IIa) represent a hydrogen atom can be proposed according to the process reported by J. Bronstein et al in J. Org. Chem. 22, 1255 (1957).

The isoindole compound represented by the general formula (IIb) can be synthesized by known processes. For example, isoindole in which all of $R^1$, $R^2$, and $R^3$ in the general formula (IIb) represent a hydrogen atom is proposed by R. Bonett et al in J. Chem. Soc. Perkin Tans. I, 1973, 1432, by J. Bornstein et al in J. Chem. Soc. Chem. Commun., 1972, 1149, by J. Bornstein et al in Tetrahedron, 35, 1055 (1979), and by G. M. Priestley et al in Tetrahedron Lett., 1972, 4295. R. Bonett et al teach that if isoindole is cation-polymerized in an acidic solvent, a polymer having a dihydroisoindole structure as the recurring unit is formed. Furthermore, a substituted isoindole in which $R^1$ and $R^2$ in the general formula (IIb) represent a hydrocarbon group can be synthesized, for example, by the process proposed by R. Kreher et al in Heterocycles, 11, 409 (1978).

The so-obtained polymer having an isoindole structure according to the present invention is easily doped with an ordinary dopant and the doped polymer has an electroconductivity higher than $10^{-4}$ s/cm. Furthermore, oxidation and reduction can be electrochemically conducted repeatedly, and an inherent color manifested in each state. The polymer having an indole structure according to the present invention is characterized in that it is stable in the oxidized state.

The present invention will now be described in detail with reference to the following examples that by no means limit the technical scope of the invention.

Note, in the examples, the $^1$H-NMR spectrum was measured by using TMS as the internal standard and a spectrometer, Model R-24B, supplied by Hitachi Ltd.

The infrared absorption spectrum was measured by using an infrared spectrophotometer, Model 270-50, supplied by Hitachi Ltd., and an infrared spectrophotometer, Model 60SXFT, supplied by Nicolet. The ultraviolet and visible spectra were measured by an auto-recording spectrophotometer, Model U-3400, supplied by Hitachi Ltd.

The electroconductivity was measured according to the four-terminal method.

The change of the visible spectrum of the polymer at the time of doping/dedoping was measured by a high-speed spectrometer, Model FSM-201, supplied by Opelex, and an instantaneous multiple photometric system, Model MCDP-100, supplied by Union Giken.

The gel permeation chromatography ws carried out by using a high-speed liquid chromatograph, Model 665, supplied by Hitachi Ltd., and a column, Showdex GPCA-802 or GPCA-804, supplied by Showa Denko K. K., in chloroform as the solvent, at a temperature of 25° C. and a flow rate of 1.02 ml/min.

EXAMPLE 1

Preparation of polyisoindole by electrochemical polymerization of isoindoline

An electrolyte shown in Table 1 and isoindoline obtained according to the process of Bornstein et al were dissolved in a solvent which had been subjected to the oxygen-removing treatment, and by using a platinum plate as the counter electrode, an ITO glass (indium tin oxide glass) as the operating electrode, and Ag/Ag+ as the reference electrode, a voltage of 0.60 V based on the Ag/Ag+ electrode was imposed on the so-formed electrolytic solution in a nitrogen atmosphere. A dark green filmy product was precipitated on the ITO glass electrode. After a predetermined quantity of electricity had been applied, the ITO glass electrode was taken out and washed with acetonitrile. Then, a voltage of −0.80 V based on the Ag/Ag+ electrode was imposed on an acetonitrile solution containing 0.1 mole/l of lithium perchlorate, which had been subjected to the oxygen-removing treatment, to remove the anion doped at the electrochemical polymerization. The ITO electrode was again washed with acetonitrile and vacuum-dried.

Figure 1:
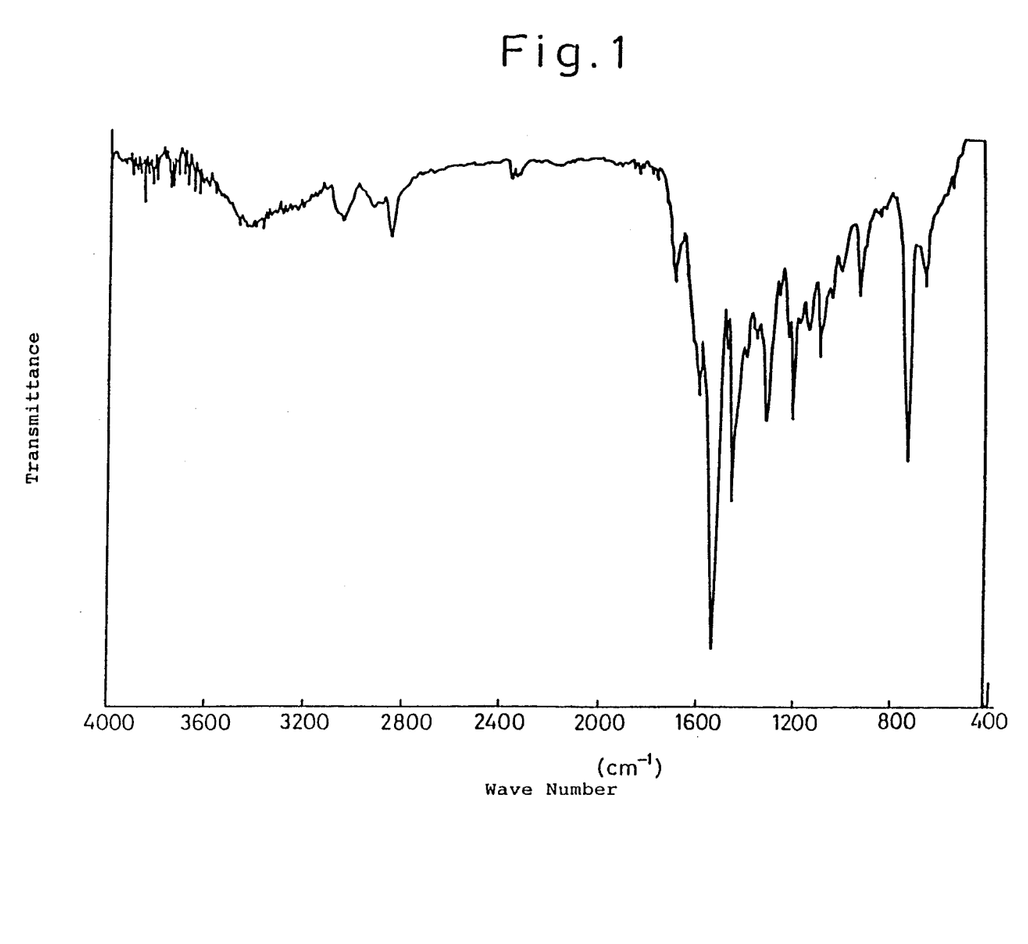
FIG. 1 is an infrared absorption spectrum diagram of the polyisoindole prepared in Example 1—1.

To so-obtained polymers are shown in Table 1. The infrared absorption spectrum of the yellowish brown polymer obtained in Example 1—1 was as shown in FIG. 1. The elementary analysis values were 82.54% for C, 4.51% for H, and 11.99% for N. Furthermore, from the results of the gel permeation chromatographical analysis in chloroform, it was found that the molecular weight of the polymer was 2,300 as calculated as polystyrene.

TABLE 1

| | | | | | Properties of polymer | |
|---|---|---|---|---|---|---|
| Example No. | Isoindoline (millimole/l) | Electrolyte (millimole/l) | Solvent (ml) | Quantity of applied electricity (coulomb) | Electro-conductivity ($\sigma_{RT}$) [s/cm] | Electroconductivity after doping with isodine ($\sigma_{RT}$) [s/cm] |
| 1-1 | 100 | n-Bu$_4$NBr 200 | CH$_3$CN 25 | 10 | $4 \times 10^{-5}$ | $1 \times 10^{-3}$ |
| 1-2 | 100 | n-Bu$_4$NBr 100 | CH$_3$CN 20 (CH$_3$)$_2$CO 5 | 3 | — | — |
| 1-3 | 100 | n-Bu$_4$NCl 200 | (CH$_3$)$_3$COH 25 | 10 | — | — |
| 1-4 | 100 | n-Bu$_4$NCl 100 | CH$_3$CN 24 NMP 1 | 10 | $2 \times 10^{-5}$ | — |
| 1-5 | 200 | Ph$_4$PCl 200 | CH$_3$CN 25 | 5 | — | — |
| 1-6 | 200 | Ph$_4$PCl 100 | CH$_3$CN 20 PhCN 5 | 10 | $3 \times 10^{-5}$ | — |
| 1-7 | 200 | Ph$_4$PBr 200 | CH$_3$CN 25 | 7 | — | — |
| 1-8 | 200 | Ph$_4$PBr 100 | CH$_3$CN 20 THF 5 | 3 | — | — |

Note
n-Bu$_4$NBr: tetra-n-butylammonium bromide
n-Bu$_4$NCl: tetra-n-butylammonium chloride
Ph$_4$PCl: tetraphenylphosphonium chloride
Ph$_4$PBr: tetraphenylphosphonium bromide
CH$_3$CN: acetonitrile
PhCN: benzonitrile
(CH$_3$)$_2$CO: acetone
NMP: N—methyl-2-pyrrolidone
(CH$_3$)$_3$COH: tertiarybutanol
THF: tetrahydrofuran

EXAMPLE 2

Figure 2:
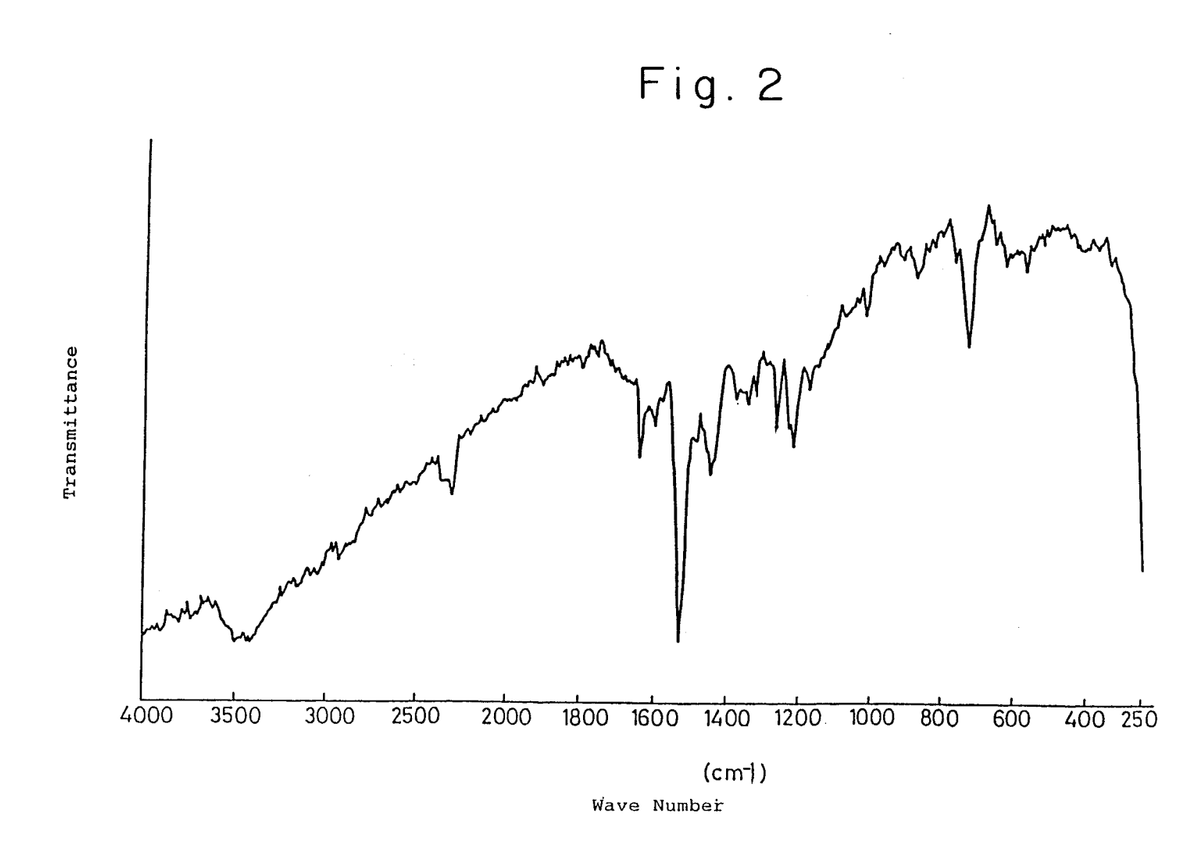
FIG. 2 is an infrared absorption spectrum diagram of the polyisoindole prepared in Example 2.

Chemical preparation of polyisoindole by oxidative polymerization of isoindoline In 80 ml of dehydrated and oxygen-removed acetonitrile were dissolved 2.38 g (0.020 mole) of isoindoline obtained in Example 1 and 12.3 g (0.050 mole) of chloranil, and reaction was carried out at 50° C. in a nitrogen atmosphere for 5 hours. The precipitate was recovered by filtration and was washed with methanol to obtain 1.3 g of a black polymer. The infrared absorption spectrum of the polymer was as shown in FIG. 2, and the spectrum was in agreement with the spectrum of the polymer obtained in Example 1—1. The electroconductivity was $3 \times 10^{-5}$ s/cm.

EXAMPLE 3

Preparation of polyisoindole by electrochemical polymerization of isoindole

An electrolyte shown in Table 2 and isoindole formed by thermally decomposing 2-methoxycarbonyloxyisoindoline according to the process of Bonett et al were immediately dissolved in a solvent which had been subjected to the oxygen-removing treatment in nitrogen to form an electrolytic solution. By using a platinum plate as the counter electrode, an ITO glass as the operating electrode, and Ag/Ag+ as the reference electrode, a voltage of 0.40 V based on the Ag/Ag+ reference electrode was imposed on the so-formed electrolytic solution at 0° C. in a nitrogen atmosphere. A dark green filmy product was precipitated on the ITO glass electrode. After application of a predetermined quantity of electricity, the ITO glass electrode was taken out and washed with acetonitrile. A voltage of −80.0 V based on the Ag/Ag+ electrode was imposed on an acetonitrile solution containing 0.1 mole/l of lithium perchlorate, which had been subjected to the oxygen-removing treatment, to remove the anion doped at the electrochemical polymerization. The ITO glass electrode was again washed with acetonitrile and vacuum-dried.

The infrared absorption spectrum of the so-obtained polymer was in agreement with that shown in FIG. 1.

TABLE 2

Electrochemical Polymerization of Isoindole

| Example No. | Isoindole (millimole/l) | Electrolyte (millimole/l) | Solvent (ml) | Quantity of applied electricity (coulomb) | Electroconductivity ($\sigma_{RT}$) [s/cm] | Electroconductivity after doping with isodine ($\sigma_{RT}$) [s/cm] |
|---|---|---|---|---|---|---|
| 3-1 | 100 | n-Bu$_4$NBr 200 | CH$_3$CN 25 | 10 | $2 \times 10^{-5}$ | $3 \times 10^{-3}$ |
| 3-2 | 100 | n-Bu$_4$NBr 100 | CH$_3$CN 20 (CH$_3$)$_2$CO 5 | 0.60 | — | — |
| 3-3 | 100 | n-Bu$_4$NCl 200 | CH$_3$CN 25 | 10 | — | — |
| 3-4 | 100 | n-Bu$_4$NCl 100 | CH$_3$CN 24 PC 1 | 10 | $5 \times 10^{-5}$ | — |
| 3-5 | 200 | Ph$_4$PCl 200 | CH$_3$CN 25 | 5 | — | — |
| 3-6 | 200 | Ph$_4$PCl 100 | CH$_3$CN 20 PhCN 5 | 10 | $7 \times 10^{-5}$ | — |
| 3-7 | 200 | Ph$_4$PBr 200 | CH$_3$CN 25 | 3 | — | — |
| 3-8 | 200 | Ph$_4$PBr 100 | CH$_3$CN 20 THF 5 | 3 | — | — |

Note
n-Bu$_4$NBr: tetra-n-butylammonium bromide
n-Bu$_4$NCl: tetra-n-butylammonium chloride
Ph$_4$PCl: tetraphenylphosphonium chloride
Ph$_4$PBr: tetraphenylphosphonium bromide
CH$_3$CN: acetonitrile
PhCN: benzonitrile
(CH$_3$)$_2$CO: acetone
PC: propylene carbonate
THF: tetrahydrofuran

EXAMPLE 4

Synthesis of polyisoindole by oxidative polymerization of isoindole

To acetonitrile, which had been subjected to the dehydrating and oxygen-removing treatment and cooled to 0° C., were added 0.59 g (5 millimoles) of isoindole and 1.48 g (6 millimoles) of tetrachloro-1,4-benzoquinone, and the mixture was stirred in a nitrogen atmosphere and the temperature was gradually elevated. Reaction was carried out at 50° C. for 5 hours. The obtained precipitate was recovered by filtration and was washed with methanol to obtain 0.38 g of a black polymer. The infrared absorption spectrum of this polymer was in full agreement with the spectrum of the polymer of Example 1 shown in FIG. 1, and the electroconductivity of the polymer was $2 \times 10^{-2}$ s/cm.

EXAMPLE 5

The procedures of Example 4 were repeated in the same manner except that 2,3-dichloro-5,6-dicyano-1,4-benzoquinone was used instead of tetrachloro-1,4-benzoquinone and chloroform was used as the solvent, and 0.35 g of a black copolymer was obtained. The infrared absorption spectrum of this polymer was in full agreement with the spectrum shown in FIG. 4, and the electroconductivity of the polymer was $3 \times 10^{-5}$ s/cm.

EXAMPLE 6

(a)

Synthesis of 2-methylindole [$R^1 = R^2 = H$ and $R^3 = CH_3$ in general formula (IIb)]

A 2-liter 4-neck flask equipped with a dropping funnel, a stirrer, a thermometer, and a nitrogen-introducing inlet was charged with 15.0 g (0.057 mole) of o-xylylene dibromide, and this o-xylylene dibromide was dissolved in 150 ml of oxygen-removed anhydrous diethyl ether. Then, 10.5 g (0.23 mole) of methylhydrazine was dropped into the solution with stirring at 20° C. over a period of 30 minutes, and the mixture was stirred at room temperature for 12 hours. The formed white precipitate was recovered by filtration and a 20% aqueous solution of caustic soda, which had been subjected to the oxygen-removing treatment, was added to the recovered solid. The mixture was then stirred for 3 hours in a nitrogen atmosphere. Then, the formed suspension was extracted with 150 ml of chloroform and the chloroform solution was washed twice with 100 ml of water, and the chloroform solution was dried with potassium carbonate and concentrated under a reduced pressure. The formed yellow solid was placed in a sublimation device and heated on an oil bath under a reduced pressure, and 2.6 (0.020 mole) of 2-methylisoindole in the form of a white needle crystal was obtained at 85° C./10 mmHg in the bottom of a cooling zone of the sublimation device. When the nuclear magnetic resonance spectrum ($^1$H-NMR) of the obtained product was determined in deuterated chloroform by using TMS as the internal standard, the following results were obtained:

δ3.90 (s, 3H), 6.9 (m, 2H), 7.0 (s, 2H), 7.5 (m, 2H).

(b)

Preparation of poly(2-methylisoindole) by electrochemical polymerization of 2-methylisoindole An electrolyte shown in Table 3 and 2-methylisoindole were dissolved in a solvent at predetermined concentrations and the solution was bubbled by dry nitrogen for more than 30 minutes to remove oxygen and form an electrolytic solution. In this electrolytic solution, electrochemical polymerization was carried out at room temperature with a predetermined quantity of applied electricity under a constant voltage of 2.0 V by using an ITO glass (indium tin oxide glass) having a surface resistance of 20 Ω/□ as the sample electrode and a platinum plate as the counter electrode. A yellowish brown film of poly(2-methylisoindole) was formed on the ITO glass sheet as the positive electrode.

A constant voltage of −1.5 V was imposed onto the formed film in an oxygen-removed acetonitrile solution containing 2 moles/l of lithium perchlorate by using a platinum plate as the counter electrode to remove the bromine ion doped at the electrochemical polymerization. Then, the film was again washed with acetonitrile and vacuum-dried.

Figure 3:
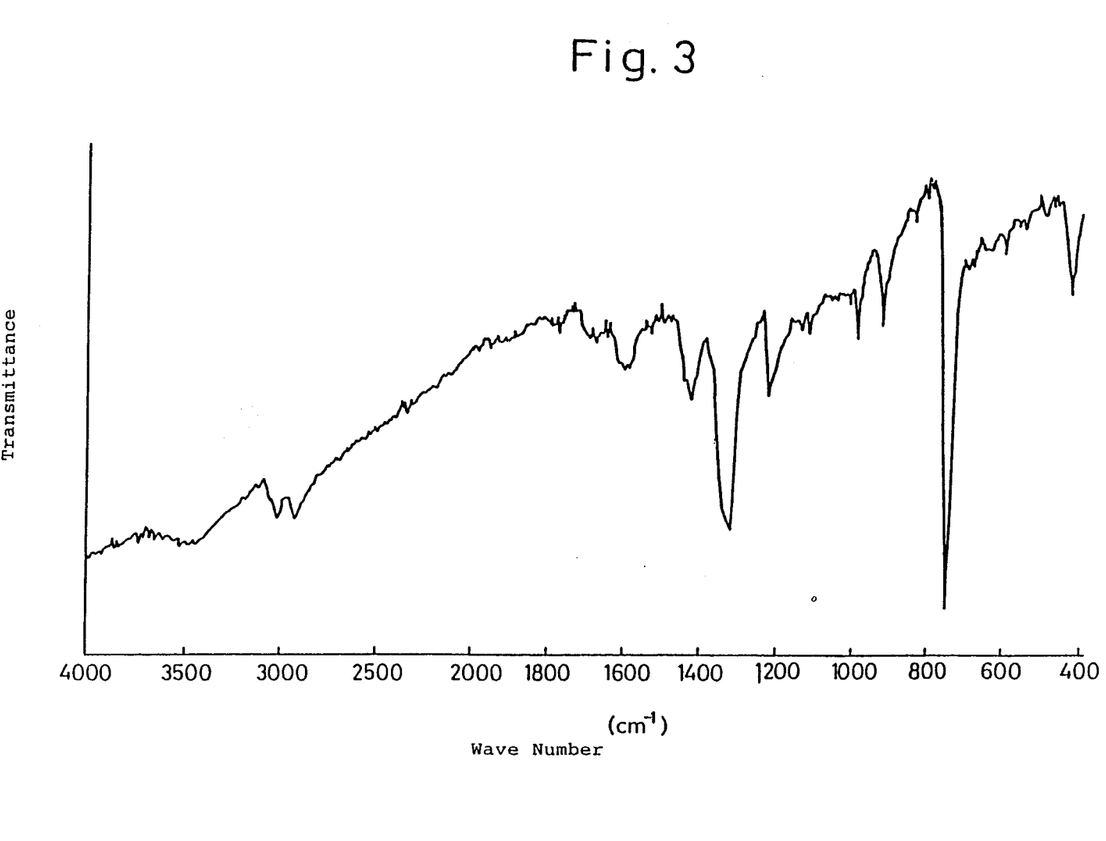
FIG. 3 is an infrared absorption spectrum diagram of the poly(2-methylisoindole) prepared in Example 6-1.

The so-obtained polymers are shown in Table 3. The infrared absorption spectrum of the yellowish brown polymer of Example 6-1 was as shown in FIG. 3. The elementary analysis values of the polymer were 83.71% for C, 5.21% for H, and 11.03% for N. From the results of the gel permeation chromatographical analysis, it was found that the molecular weight was 1700 as calculated as polystyrene. The above-mentioned found elementary analysis values were in full agreement with the calculated values (83.62% for C, 5.54% for H, and 10.84% for N) based on the following structure estimated from the foregoing results:

The nuclear magnetic resonance spectrum ($^1$H-NMR) of the polymer was determined in deuterated chloroform by using TMS as the internal standard. The following results were obtained.

δ3.77 (s, 3H), 7.40 (m, 4H).

EXAMPLE 7

Figure 4:
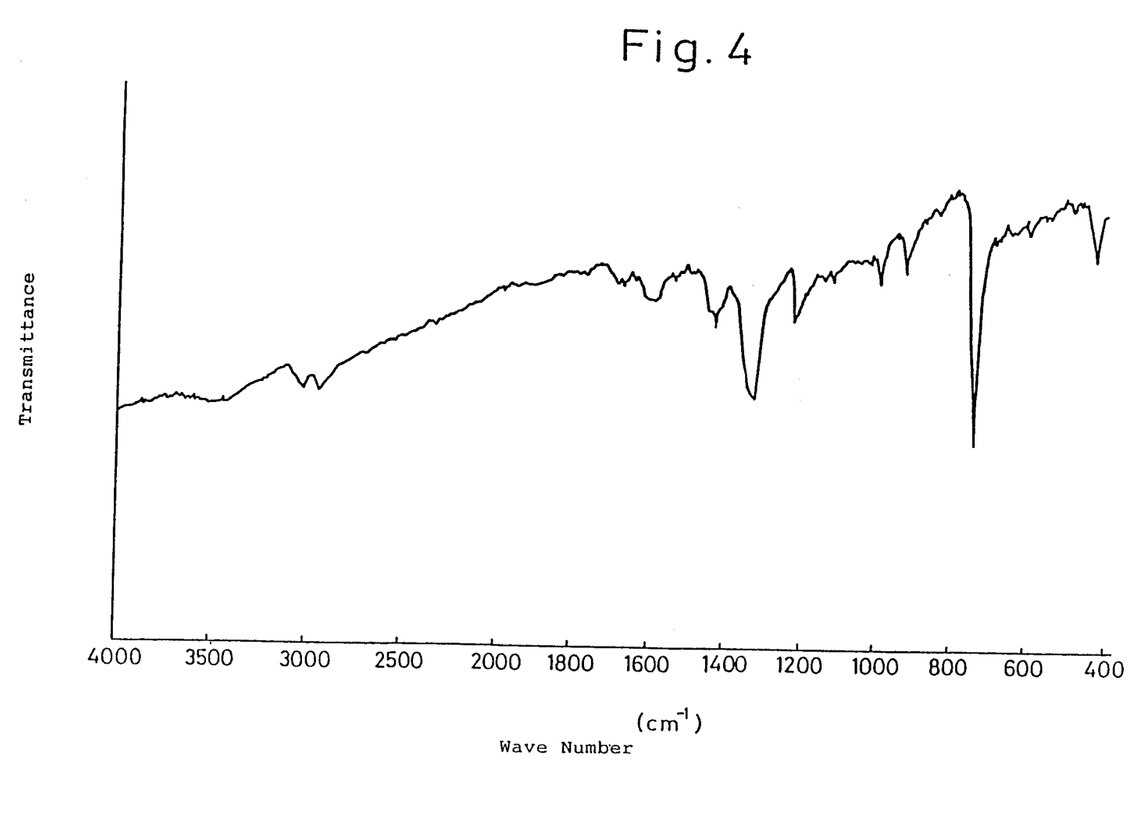
FIG. 4 is an infrared absorption spectrum diagram of the poly(2-methylisoindole) prepared in Example 7.

Chemical preparation of poly(2-methylisoindole) by oxidative polymerization of 2-methylisoindole 2-Methylisoindole was synthesized according to the process disclosed in Example 6-(a). In 80 ml of dehydrated chlorobenzene were dissolved 2.0 g (0.15 mole) of 2-methylisoindole and 10.4 g (0.458 mole) of 2,3-dichloro-5,6-dicyano-1,4-benzoquinone, and reaction was carried out under boiling in a nitrogen atmosphere for 10 hours. The formed precipitate was recovered by filtration and washed with hot methanol to obtain 1.6 g of a black polymer. The infrared absorption spectrum of the obtained polymer was as shown in FIG. 4. The electroconductivity of the polymer was $5.0 \times 10^{-7}$ s/cm.

REFERENTIAL EXAMPLE

This example illustrates that the isoindole polymer obtained according to the present invention is valuable as an electrochromic display material.

Figure 5:
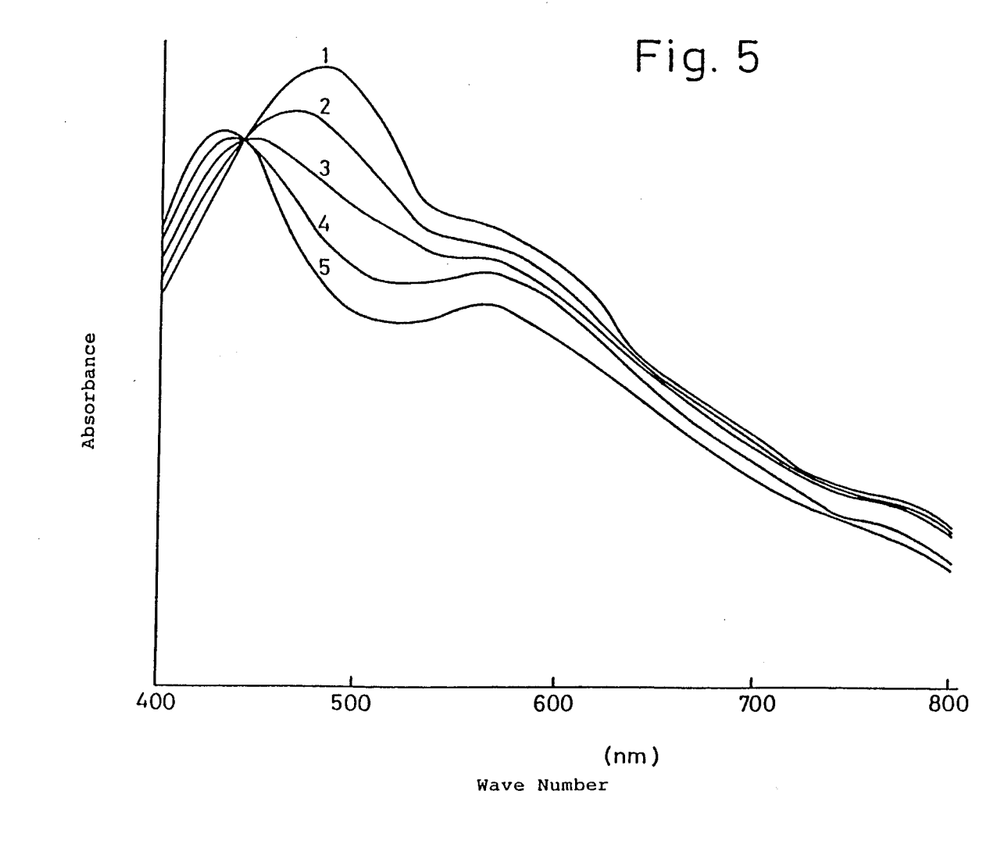
FIG. 5 is a diagram showing the change of the visible spectrum of polyisoindole at the steps of doping and dedoping, which was obtained by the electrochromic material test described in Reference Example (a)

(a) An electrode covered with polyisoindole obtained in Example 1-2 and a platinum mesh electrode were immersed in an acetonitrile solution containing 1.0 mole/l of lithium perchlorate. When the voltage between the electrodes was changed in the range of from −60.0 V to +3.0 V, it was found that the color of the polyisoindole ws reversibly changed from yellowish brown to green. This change of the color is shown as the visible spectrum in FIG. 5. In FIG. 5, curve 1 indicates the spectrum in the neutral state. An increase of the curve number indicates the advance of doping. The color was changed to green from yellowish brown with this advance of doping.

Figure 6:
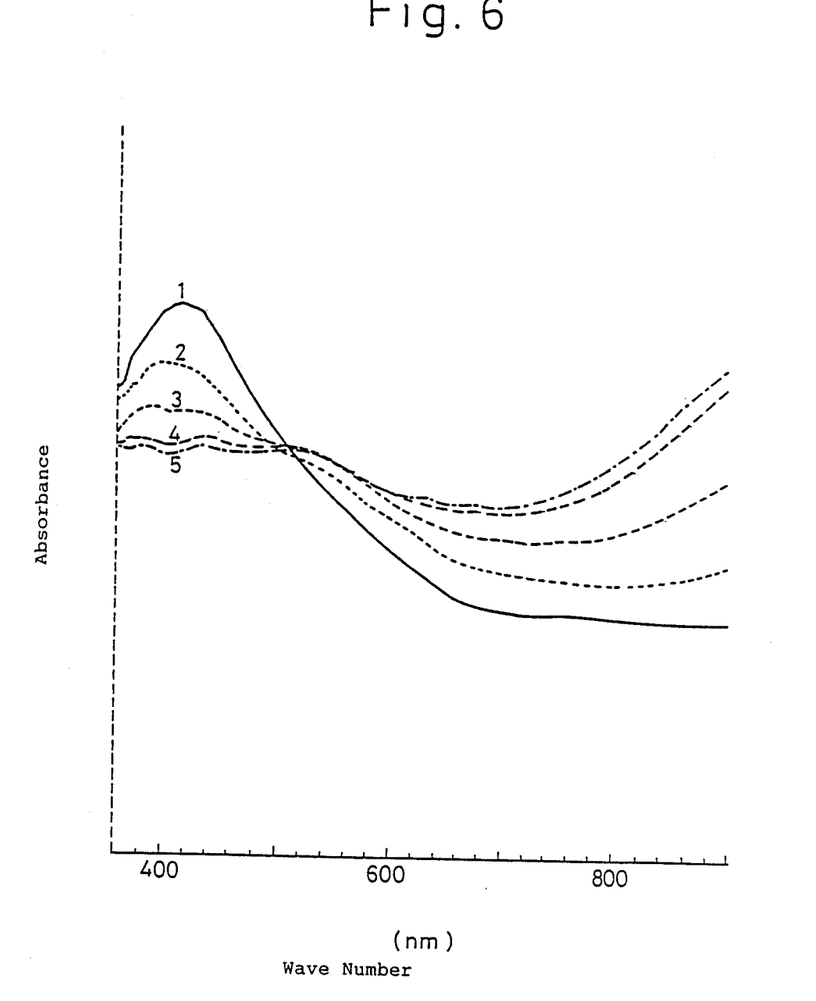
FIG. 6 is a diagram showing the change of the visible spectrum of poly(2-methylisoindole) at the steps of doping and dedoping, which was obtained by the electrochromic material test described in Reference Example (b).

(b) An electrode covered with poly(2-methylisoindole) obtained in Example 6-2 and a platinum mesh electrode was immersed in a solution of tetra-n-butylammonium tetrafluoroborate in water/acetonitrile (9/1 volume ratio) and the voltage between the electrodes was changed in the range of from −1.5 V to +2.5 V. It was found that the color of poly(2-methylisoindole) was reversibly changed from yellow-

TABLE 3

Electrochemical Polymerization of 2-Methylisoindole

| Example No. | 2-Methylisoindole (millimole/l) | Electrolyte (millimole/l) | Solvent (ml) | Quantity of applied electricity (coulomb) | Properties of polymer Electroconductivity ($\sigma_{RT}$) [s/cm] | Electroconductivity after doping with isodine ($\sigma_{RT}$) [s/cm] |
|---|---|---|---|---|---|---|
| 6-1 | 78.0 | n-Bu$_4$NBr 200 | CH$_3$CN 25 | 10 | $8 \times 10^{-6}$ | $3 \times 10^{-4}$ |
| 6-2 | 78.0 | n-Bu$_4$NBr 200 | CH$_3$CN 20 CH$_2$Cl$_2$ 5 | 0.60 | — | — |
| 6-3 | 78.0 | n-Bu$_4$NCl 200 | CH$_3$CN 25 | 10 | — | — |
| 6-4 | 78.0 | n-Bu$_4$NCl 200 | CH$_3$CN 24 NMP 1 | 10 | $5 \times 10^{-6}$ | — |
| 6-5 | 100 | Ph$_4$PCl 200 | CH$_3$CN 25 | 10 | — | — |
| 6-6 | 100 | Ph$_4$PCl 200 | CH$_3$CN 20 PhCN 5 | 10 | $6 \times 10^{-6}$ | — |
| 6-7 | 100 | Ph$_4$PBr 200 | CH$_3$CN 25 | 10 | — | — |
| 6-8 | 100 | Ph$_4$PBr 200 | CH$_3$CN 20 PhCN 5 | 10 | — | — |

Note
n-Bu$_4$NBr: tetra-n-butylammonium bromide
n-Bu$_4$NCl: tetra-n-butylammonium chloride
Ph$_4$PCl: tetraphenylphosphonium chloride
Ph$_4$PBr: tetraphenylphosphonium bromide
CH$_3$CN: acetonitrile
PhCN: benzonitrile
CH$_2$Cl$_2$: dichloromethane
NMP: N—methyl-2-pyrrolidone ish brown to blue. This change of the color is shown as the visible spectrum in FIG. 6. In FIG. 6, curve 1 shows the spectrum in the neutral state, and an increase of the curve number indicates an advance of doping. The color was changed from yellowish brown to blue with the advance of dopant.

CAPABILITY OF EXPLOITATION IN INDUSTRY

The polymer having an isoindole structure according to the present invention is valuable as an electrode, an electrochromic display element, a solar cell, an electric connection, a device for absorbing and converting electromagnetic waves, and a reversible oxidation-reduction system in the fields of the electric and electronic industries.

We claim:

1. A polymer having an isoindole structure containing monomer units selected from the group consisting of monomer units of the formula:

wherein $R^1$, $R^2$ and $R^3$ independently represent a hydrogen atom or a hydrocarbon group having 1 to 5 carbon atoms, $X^-$ represents an anion of an electrolyte, y is a number of from 0.01 to 1, which indicates the proportion of the anion to 1 mole of the monomer, and n is a number of from 5 to 500, which indicates the degree of polymerization.

2. A polymer as set forth in claim 1, wherein the anion $X^-$ of the electrolyte is selected from the group consisting of $Cl^-$, $Br^-$, $I^-$, $ClO_4^-$, $BF_4^-$, $PF_6^-$, $AsF_6^-$, $SbF_6^-$, $AlCl_4^-$, $AlBr_3Cl^-$, $FeCl_4^-$, $SnCl_3^-$ and $CF_3SO_3^-$.

3. A polymer as set forth in claim 1, which is polyisoindole where each of $R^1$, $R^2$ and $R^3$ is H.

4. A polymer as set forth in claim 1, which is poly(2-methylisoindole) where each of $R^1$ and $R^2$ is H and $R^3$ is $CH_3$.

* * * * *